Patented July 20, 1948

2,445,345

UNITED STATES PATENT OFFICE 2,445,345

PROCESS FOR THE CATALYTIC REFORMING OF HYDROCARBON MIXTURES

Alva C. Byrns, Oakland, Calif., assignor to Union Oil Company of California, Los Angeles, Calif., a corporation of California No Drawing. Application February 20, 1943, Serial No. 476,617

10 Claims. (Cl. 196—24)

This application relates to the preparation of catalysts by a method involving the use of magnesium hydroxide.

It is an object of this invention to provide a novel, efficient method for the preparation of catalysts having a magnesium compound as a base. Further objects involve the use of these catalysts in hydrogenation, de-sulfurization and hydrocarbon conversion processes.

It has long been known that magnesium oxide is an excellent catalyst carrier or support, but efficient methods for preparation of magnesia supported catalysts have been rather lacking. For example, it has been proposed to prepare dehydrogenation catalysts by suspending magnesium oxide in a solution of a chromium salt, subsequently either adding an alkali hydrate or carbonate to precipitate the chromium, or evaporating the solution to the desired degree in order to force the magnesia to adsorb a limited amount of the chromium salt.

It has been found that magnesium hydroxide may be used in preparation of this and similar types of catalysts much more effectively and efficiently than can the magnesium oxide heretofore employed. The exact reasons why magnesium hydroxide is superior to the oxide in this respect are not known definitely. It is known, however, that magnesium hydroxide is somewhat more water-soluble than the hydroxides of many metals, such as cobalt, nickel, copper, manganese, zinc, etc., which are useful in catalyst preparation, and it is believed that when a solution of water-soluble salt of a metal such as one of those mentioned is added to a magnesium hydroxide suspension, a direct base exchange reaction such as for example

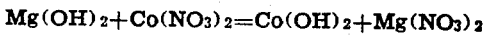

$$Mg(OH)_2 + Co(NO_3)_2 = Co(OH)_2 + Mg(NO_3)_2$$

takes place whereby the hydroxide of the added metal is formed at the surface of the solid magnesium hydroxide particles which themselves supply the necessary hydroxide. Such base exchange is believed to be especially easy when the added metal ion is in a divalent state, since the magnesium is also divalent. This type of reaction apparently results in the formation of a product having an exceptionally uniform distribution of the added metal hydroxide on the surface of the magnesia base, as well as a relatively homogeneous structure in which the added metal and the magnesium are in uniform close contact. These features are believed to be desirable in the production of efficient catalysts. It has also been observed that suspensions of magnesium oxide are more granular or crystalline in nature than suspensions of magnesium hydroxide, particularly suspensions of freshly precipitated undried magnesium hydroxide which actually has the character of a gel. This somewhat gelatinous structure is also believed to be more effective than a crystalline structure for the adsorption of the added metal compounds, and it is also believed, therefore, that when the hydroxides of certain other metals are precipitated in the presence of suspended magnesium hydroxide, a more active catalyst may be obtained than when the added metals are precipitated in the presence of magnesium oxide. It is desired not to limit the invention by the above theories.

Briefly, the invention involves deposition of the hydroxide or other compound of a catalytic metal or metals on suspended magnesium hydroxide in molal excess. One type of process for accomplishing this involves merely suspending an excess of magnesium hydroxide in a solution of a soluble salt of a metal which forms a relatively insoluble hydroxide. The metals whose compounds (preferably divalent) may be used in this type of process are in general those forming hydroxides less soluble than magnesium hydroxide, such as the metals of atomic number 22 to 30, inclusive. These metals include titanium, vanadium, chromium, magnesium, iron, cobalt, nickel, copper and zinc. Divalent cobalt, nickel, copper, zinc, and manganese, are preferred, the cobalt, nickel and copper constituting an especially desirable and preferred group.

It has also been found that active catalysts may be prepared by adding an acidic oxide of an element of the left hand column of the 6th group of the periodic table, preferably molybdenum or tungsten, to the magnesium hydroxide suspension. In this instance the acidic oxide may react with the magnesium hydroxide to form a compound, such as magnesium tungstate where tungstic acid is employed, this compound being adsorbed on the remaining magnesium hydroxide.

The above two types of processes may be combined to obtain catalysts consisting of compounds of metals of each group on a magnesium hydroxide support. This may be done by adding both a solution of a soluble salt of a metal of the first group and a solution or suspension of an acidic oxide of the second group, such as molybdic acid or tungstic acid, etc., to the magnesium hydroxide suspension.

As an example of a catalyst containing a metal of the first group above, about two thousand grams (10 moles) of magnesium chloride $(MgCl_2 6H_2O)$ may be dissolved in about 10 liters of water and converted to the hydroxide by precipitation with about 800 grams (20 moles) of caustic soda, or about 740 grams (10 moles) of $Ca(OH)_2$ if preferred. This product may then be washed free of soluble materials such as sodium or calcium chloride, and resuspended in about 10 liters of distilled water. About 300 grams (1 mole) of cobalt nitrate $(Co(NO_3)_2.6H_2O)$ may then be dissolved in about one liter of water and this solution added to the magnesium hydroxide suspension. As soon as the bulk of the cobalt has been removed from the solution as indicated by the disappearance of the bulk of the characteristic color of the solution, the solid product may be filtered off, dried, and granulated or pelleted.

As an example of a catalyst containing a metal of the second group above, about 2,500 grams (10 moles) of magnesium nitrate $(Mg(NO_3)_2.6H_2O)$ may be dissolved in about 10 liters of water and precipitated as magnesium hydroxide by the addition of about 1300 ml. of 15N ammonium hydroxide. Without filtering or washing the resulting precipitate, about one mole of molybdic acid $(H_2MoO_4)$ or one-seventh moles of ammonium paramolybdate $((NH_4)_6Mo_7O_{24}.H_2O)$ is dissolved or suspended in a small amount of water and added to the magnesium hydroxide suspension. After thorough mixing and settling, the resulting product is filtered off and dried.

As an example of a cobalt molybdate type of catalyst, the cobalt treated magnesium hydroxide suspension prepared as in the first example above may be combined with an aqueous suspension or solution containing about one-seventh moles of ammonium paramolybdate $((NH_4)_6Mo_7O_{24}.H_2O)$ or about one mole of molybdic acid $(H_2MoO_4)$, and the resulting product settled, filtered and dried.

A second method of preparing a similar catalyst involves mixing an aqueous solution containing one mole of cobalt nitrate with a suspension or solution containing one-seventh moles of ammonium paramolybdate or one mole of molybdic acid, and adding this mixture to a suspension of about 10 moles of magnesium hydroxide.

Since in both of the latter two instances the cobalt and molybdenum are added in approximately equivalent amounts, a precipitate of cobalt molybdate may be formed at the surface of the magnesium hydroxide particles. Such cobalt molybdate catalysts, when dried and granulated or pelleted, are especially active for desulfurization, as described below. Catalysts may be prepared from the other metals mentioned above, by analogous methods. It is not necessary that the added metals be added in equivalent amounts, but this is a preferred procedure.

In all of the above examples, it is apparent that the magnesium hydroxide is present in large excess. This is desirable and it is preferred that the magnesium hydroxide originally present should be sufficient to react with all the added material with which it will react and leave a residue of unreacted magnesium hydroxide. Preferably the ratio of equivalents of magnesium hydroxide present to total equivalents of metal compounds added should exceed about 5:1, the term "equivalents" referring to reacting weights.

As indicated above, freshly precipitated undried magnesium hydroxide is preferred because of its gelatinous structure but the mineral brucite which is natural magnesium hydroxide may also be used in some instances, especially if it is ground up to a fine powder before being suspended in the water. Magnesium hydroxide which has been dried but not subjected to sufficiently high temperatures to convert the bulk of it to the oxide, may also be used.

The catalyst of this invention may be employed in a number of processes. The copper-magnesium catalyst prepared in a manner analogous to that illustrated in the first example given above is especially active as a hydrogenation catalyst when used at relatively low temperatures such as about 200° F. to 400° F. in the presence of large amounts of hydrogen preferably under superatmospheric pressures. It may also be used as a dehydrogenation catalyst at higher temperatures such as 800° F. to 1500° F. and pressures below about 50 pounds per square inch gage. For example, normal butane may be dehydrogenated at a temperature of about 1050° F. and at substantially atmospheric pressure, utilizing a gas flow of about 1000 volumes of gas (measured at 0° C. and atmospheric pressure) per volume of catalyst per hour, to obtain a substantial conversion to butenes. The butene-butane mixture obtained from such an operation may be further dehydrogenated at a temperature of about 1200° F. and at a subatmospheric pressure of about 100 millimeters absolute, or a partial pressure of about 100 millimeters absolute attained by the use of inert diluent gases such as nitrogen, or steam in some instances, utilizing a hydrocarbon gas flow of about 800 volumes of gas (measured at 0° C. and atmospheric pressure) per volume of catalyst per hour, to obtain a substantial conversion to butadiene.

Analogous catalysts prepared with magnesium hydroxide and the other metals mentioned above, namely cobalt, nickel, zinc, and manganese may also be used effectively in both hydrogenation and dehydrogenation processes under the conditions shown above.

The catalyst of another type exemplified above, namely the cobalt molybdate-magnesium hydroxide catalyst, is especially active for desulfurization. For example, a gasoline fraction from high sulfur crude oil may be desulfurized from a sulfur content of about 0.8% to a sulfur content of less than 0.1% by subjecting it to a temperature between about 700° F. and 1000° F. in the presence of excess hydrogen at a pressure above atmospheric and preferably above about 150 pounds per square inch, in the presence of the above catalyst.

All of the catalysts of this invention are active catalysts for hydroforming, dehydrogenation, desulfurization, and cracking, and like reactions, which occur in the catalytic reforming of hydrocarbon mixtures. These processes generally involve temperatures between about 700° F. and 1500° F. and may or may not utilize hydrogen or inert gases, such as steam and flue gases.

Many of the catalysts of this invention are also suitable for use in the Fischer Tropsch synthesis of hydrocarbons from carbon monoxide and hydrogen. Many of them also respond to the action of promoters such as alkali metal carbonates, thoria, etc.

A method of catalyst preparation which is related to the above described methods utilizing magnesium hydroxide involves the use of magnesium silicate instead of magnesium hydroxide in the same type of process described above. Magnesium silicate and soluble salts of metals which will form silicates less soluble than magnesium silicate will also undergo basic exchange. Also the magnesium silicate especially when precipitated and undried, is very active in absorbing catalytic materials from solution. The resulting silicate catalysts are quite active especially for catalytic conversion processes, although the catalysts prepared from magnesium hydroxide are preferred. Both the magnesium hydroxide and the magnesium silicate of this invention may be classed as hydrous gelatinous alkaline magnesium precipitates.

Other modifications may be made which will be apparent to one skilled in the art and they are to be considered part of the invention as defined in the following claims.

I claim:

1. A process for desulfurizing volatile hydrocarbons which comprises subjecting said hydrocarbons to an elevated temperature and pressure in the presence of hydrogen and a catalyst prepared by suspending magnesium hydroxide in water and adding thereto a water soluble cobalt salt and a molybdenum compound from the class consisting of ammonium paramolybdate and molybdic acid, the cobalt and molybdenum being employed in equivalent amounts to obtain cobalt molybdate, and the ratio of equivalents of magnesium hydroxide originally present to cobalt molybdate being greater than about 5:1, and drying the resulting product.

2. A process for the catalytic reforming of hydrocarbon mixtures which comprises subjecting said mixtures to an elevated reforming temperature in the presence of a catalyst prepared by suspending in water a hydrous gelatinous alkaline magnesium precipitate selected from the class consisting of magnesium hydroxide and magnesium silicate, adding thereto less than an equivalent amount of a water soluble salt of a metal of the class consisting of metals of atomic number 22 to 30 inclusive, and separating, washing, and drying the resulting solid product.

3. A process according to claim 2 in which the magnesium precipitate is magnesium hydroxide.

4. A process according to claim 2 in which the magnesium precipitate is magnesium silicate.

5. A process for the catalytic reforming of hydrocarbon mixtures which comprises subjecting said mixtures to a temperature between about 700° F. and about 1200° F. In the presence of a catalyst prepared by suspending an excess of precipitated magnesium hydroxide in water, adding thereto not only a water soluble salt of a metal of the class consisting of metals of atomic number 22 to 30 inclusive, but also an acidic oxide of a different metal selected from the class consisting of metals of the left-hand column of group 6 of the periodic table, thereby allowing minor proportions of said salt and said acidic oxide to be deposited on said magnesium hydroxide, separating the resulting aqueous solution, and drying the so-treated product.

6. A process for the catalytic reforming of hydrocarbon mixtures which comprises subjecting said mixtures to a temperature between about 700° F. and about 1200° F. in the presence of a catalyst prepared by suspending an excess of magnesium silicate in water, adding thereto not only a water soluble salt of a metal of the class consisting of metals of atomic number 22 to 30 inclusive, but also an acidic oxide of a different metal selected from the class consisting of metals of the left-hand column of group 6 of the periodic table, thereby allowing minor proportions of said salt and said acidic oxide to be deposited on said magnesium silicate, separating the resulting aqueous solution, and drying the so-treated product.

7. A process according to claim 5 in which the metal of atomic number 22 to 30 is copper.

8. A process for the dehydrogenation of hydrocarbons under conditions which include desulfurization which comprises subjecting such hydrocarbons to an elevated temperature in the range of 700° F. to about 1200° F. in the presence of a catalyst prepared by suspending precipitated magnesium hydroxide in water, adding thereto less than an equivalent amount of a water soluble salt of a metal of the class consisting of metals of atomic number 22 to 30 inclusive, and separating, washing and drying the resulting solid product.

9. A process for the catalytic desulfurization of hydrocarbon mixtures which comprises subjecting said mixtures to a temperature between about 700° F. and 1000° F. in the presence of a catalyst prepared by suspending precipitated magnsium hydroxide in water, adding thereto less than an equivalent amount of a water soluble nickel salt, and separating, washing and drying the solid product.

10. A process for the catalytic desulfurization of hydrocarbon mixtures which comprises subjecting said mixtures to a temperature between about 700° F. and 1000° F. in the presence of a catalyst prepared by suspending precipitated magnesium hydroxide in water, adding thereto less than an equivalent amount of a water soluble cobalt salt, and separating, washing and drying the solid product.

ALVA C. BYRNS.

REFERENCES CITED

The following references are of record in the file of this patent:

UNITED STATES PATENTS

| Number | Name | Date |
|---|---|---|
| 1,809,554 | Hirt | June 9, 1931 |
| 2,034,896 | Calcott et al. | Mar. 24, 1936 |
| 2,042,298 | Davis | May 26, 1936 |
| 2,122,786 | Tropsch | July 5, 1938 |
| 2,137,275 | Ellis | Nov. 22, 1938 |
| 2,205,141 | Heard | June 18, 1940 |
| 2,231,446 | Grosse | Feb. 11, 1941 |
| 2,246,682 | Heard | June 24, 1941 |
| 2,257,082 | Yarnall | Sept. 23, 1941 |
| 2,278,223 | Sturgeon | Mar. 31, 1942 |
| 2,315,144 | Watson | Mar. 30, 1943 |
| 2,335,550 | Sturgeon | Nov. 30, 1943 |
| 2,361,651 | Proell et al. | Oct. 31, 1944 |
| 2,367,496 | Greentree | Jan. 16, 1945 |
| 2,377,083 | Kearby | May 29, 1945 |
| 2,395,876 | Kearby | Mar. 5, 1946 |
| 2,408,146 | Kearby | Sept. 24, 1946 |

FOREIGN PATENTS

| Number | Country | Date |
|---|---|---|
| 504,614 | Great Britain | Apr. 24, 1939 |

OTHER REFERENCES

Seidel, "Solubility of Inorganic and Organic Compounds," vol. II (1928), page 1284.